Figure 1:
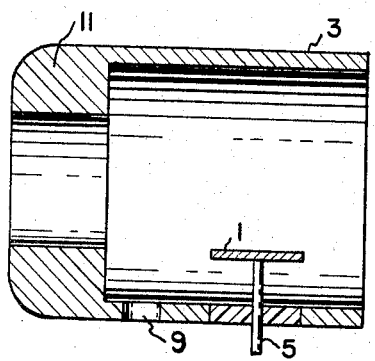

June 20, 1967  J. W. CABLE  3,327,086

RADIO FREQUENCY HEATING APPARATUS

Filed Sept. 24, 1964

INVENTOR.
J. W. CABLE
BY

United States Patent Office 3,327,086
Patented June 20, 1967

3,327,086
RADIO FREQUENCY HEATING APPARATUS
Joseph Wesley Cable, Monroe, Conn., assignor to Cabot Corporation, Boston, Mass., a corporation of Delaware
Filed Sept. 24, 1964, Ser. No. 399,037
3 Claims. (Cl. 219—10.61)

The present invention relates generally to high frequency heating apparatus and more specifically to novel high frequency heating apparatus for curing heat curable plastic compositions.

In recent years, the production of formed and cured shapes from heat curable plastic compositons has attained considerable importance. Items comprising a cured plastic composition such as pipe, tubing, rodstock, coatings for cable and wire, and other diverse products have been successfully produced and have found use in many applications.

A general process by which said items are produced comprises forming the plastic composition at temperatures below the minimum curing temperature thereof and thereafter heating the formed composition to active curing temperatures.

A well known method by which certain curable plastic compositions can be heated to curing temperature has been disclosed, for instance, in U.S. Patent 2,972,780, to Bram B.S.T. Boonstra. Said method comprises, in its broadest aspect, producing a field of high frequency (i.e. between about 2 and about 90 megacycles) alternating current and thereafter subjecting a heat curable plastic composition to the influence of said field. It is thought that the heating effect is caused by molecular orientation and/or dielectric losses within the composition. Said curing process is extremely advantageous in that (1) heating of the composition is accomplished substantially more evenly and rapidly throughout the mass thereof and with lower thermal gradients than is the case with conduction or radiation heating methods and (2) the plastic composition can be cured without the necessity for physical contact between said composition and the heating apparatus.

The plastic compositions utilized generally comprise a plastic material having dispersed therein (1) a curing agent which is normally thermally activatable only at temperatures higher than those temperatures required to form said plastic material, and (2) a conductive filler. An example of a typical heat curable plastic composition and one which has been found to be particularly valuable comprises a low or high density polyethylene having dispersed therein an organic peroxide curing agent and carbon black.

Unfortunately, many curing agents presently utilized in the art, for instance, organic peroxides such as benzoyl peroxide, dicumyl peroxide, t-butyl peroxide, 2,5 dimethyl di(t-butylperoxy) hexyne-3, etc., and/or the reaction products of the curing process often display toxic properties. This constitutes a serious problem because said curing agents and/or certain said reaction products often tend to volatilize and disperse into the atmosphere during the curing process, thereby permeating the atmosphere with toxic or potentially toxic substances. Although conventional air evacuation and filter systems, such as chemical hoods placed over or surrounding the process line, have attained a measure of success in the removal of said volatile substances from the atmosphere, nevertheless said systems have generally been found to be relatively inefficient. Thus, said systems generally do not provide substantial removal of said substances from the atmosphere immediately surrounding the curing operation. Moreover, since some adjustments in the curing process line are normally necessary, it is usually necessary that at least the hands and arms of a worker come into contact with the volatilized substances. Accordingly, it has been found that personnel working in an area in which plastic compositions are being cured often suffer dermatological symptoms, especially about the hands and arms.

Another problem inherent in high frequency heating processes in general and particularly in high frequency heating of plastic compositions resides in a tendency to arcing or corona discharge between electrodes and/or electrodes and the plastic composition. When such a phenomenon takes place, the plastic composition is generally scorched and rendered useless.

It has been discovered that arching or corona discharge is directly related to and affected by the amount of ionized substances present about the electrodes and plastic composition during operations. Heretofore, high frequency heating apparatus generally known to the art have made no provision for the removal of said ionized substances from the curing zone; hence vaporized organic peroxide curing agents and/or the reaction products of the curing process usually linger about said zone, thereby increasing the probability of arcing or corona discharge.

Still another disadvantage often encountered in the curing of plastic composition of high frequency processes resides in the fact that high frequency heating apparatus of the type presently known to the art generally comprises one or more ground electrodes and one or more high potential electrodes which are exposed to the surrounding environment. At the relatively high voltages generally required for curing plastic compositions, said exposed electrodes consitute a serious burn and shock hazard to personnel as well as presenting a major source of spurious radiation which radiation can affect operations of near-by sensitive electrical and/or radio equipment. Heretofore, safety and radiation shielding of said electrodes has generally been accomplished by enclosing said electrodes in a wire or screen cage, which cage is grounded. Although the aforementioned type of shielding affords a measure of protection, said shielding is often extremely cumbersome.

In accordance with the present invention, however, these problems have been substantially alleviated.

It is a principal object of the present invention to provide improved high frequency heating apparatus.

It is another object of the present invention to provide high frequency heating apparatus requiring no external shielding.

It is another object of the present invention to provide apparatus for controlling during the curing process the atmosphere between high frequency electrodes and the composition being cured.

It is another object of the present invention to provide high frequency heating apparatus for the curing of heat curable plastic compositions which vastly reduces the amount of volatile substances which normally escape into the surrounding atmosphere during curing operations.

Other objects will in part be obvious and will in part appear hereinafter.

The above and other objects and advantages of the present invention are realized when there is utilized the heating apparatus of the present invention which comprises an electrically conductive enclosure means, at least two ground electrodes positioned within and in electrical communication with said enclosure means, a high potential electrode positioned within and electrically insulated from said enclosure means, and aperture means through said ground enclosure means.

Figure 3:
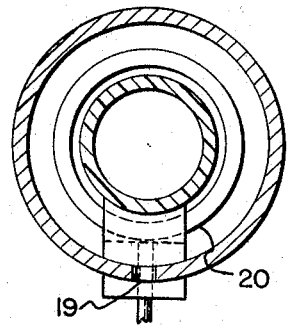
Figure 2:
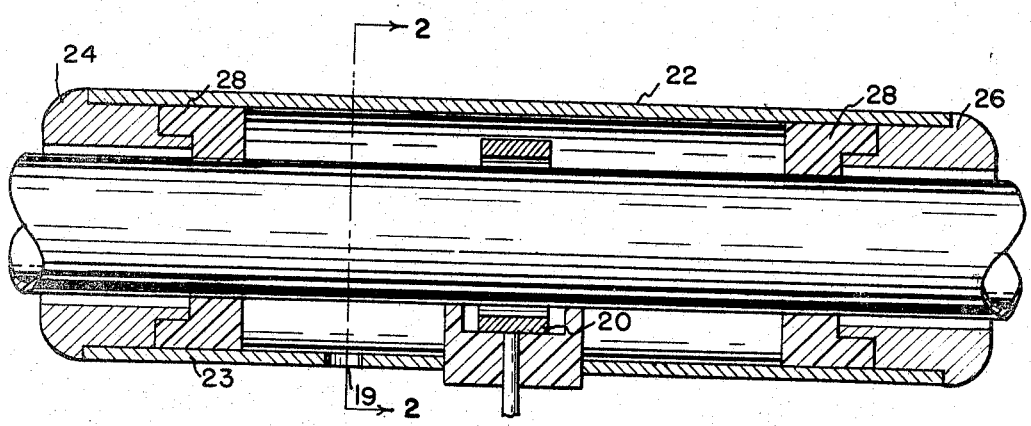

A better understanding of the present invention can be had when reference is made to the drawings forming part hereof wherein:

FIGURE 1 is a longitudinal schematic diagrammatic representation of one embodiment of the present invention, FIGURE 2 is a longitudinal schematic diagrammatic representation of a preferred embodiment of the present invention shown in operation, and FIGURE 3 is a cross-sectional view of the apparatus of FIGURE 2 taken through lines 2—2.

Referring now to FIGURE 1, the high potential lead of a high frequency power source (not shown) is connected to electrode 1 through connector means 5 which means is electrically insulated from enclosure means 3. The enclosure means makes electrical connection with the ground lead of the high frequency power source by any suitable means. In operation the high frequency power source is actuated and the formed plastic heat-curable composition is passed through the high frequency field produced between high potential electrode 1 and ground electrode 11. As said composition is heated, volatile substances leave the surface of the composition and are withdrawn through aperture 9 into a suitable collection system by any means, such as a vacuum pump connected in series with a condensor trap and/or filter.

The materials from which the improved apparatus of the present invention can be fabricated are subject to considerable variation. Generally speaking, the electrical parts, i.e. the electrodes, connection means, enclosure means, etc., can be constructed of any substance having a relatively high electrical conductivity. Thus, metals such as aluminum, copper, beryllium, zinc, silver and alloys thereof, etc., are found to be satisfactory materials of fabrication. Aluminum has generally been found to be especially suitable due to the lightness, machinability, and good electrical conductivity thereof.

The materials which comprise the insulation means of the apparatus of the present invention are also subject to considerable variation. Any electrically insulative material which can physically and chemically withstand the temperatures, reactants, and reaction products encountered during operations are suitable. Specific examples of generally suitable insulation materials are mica; glass; vitreous china; olefinic polymers such as polyethylene, and especially polymers of halogenated olefins such as polytetrafluoroethylene and polytrifluorochloroethylene. I find that the solid polymers of tetrafluoroethylene are particularly well suited for use as the insulation materials of the present apparatus because said polymers are generally chemically resistant to the curing agents and reaction products of the curing process, have relatively high softening temperatures, under many conditions possess excellent electrical insulation properties, and are easily shaped.

The design specifics of the apparatus of the present invention are generally variable and are determined to a great extent by the shape, size and thickness of the formed composition to be cured. It should be noted that it is much preferred that shap corners and projections on the electrodes be avoided as much as possible because, as is well known in the art, acute angles, corners, projections, and the like provide potential sources for arcing and corona discharge at high frequencies and voltages.

It is also important that the shortest air gap distance occur between the electrodes and the composition undergoing cure. If instead, for example in FIGURE 1, the shortest air gap distance occurs between electrode 1 and enclosure 3, or between electrode 1 and electrode 11, the probability of arcing or corona discharge is greatly enhanced. It should be further noted that the heating apparatus is preferably designed such that a substantially coaxial relationship between the shaped composition undergoing cure and the electrodes can be established and maintained.

A preferred embodiment of the present invention for curing heat curable plastic pipe or rodstock forms, is shown in FIGURES 2 and 3 wherein high potential circular electrode 20 is positioned within enclosure 22 having in electrical communication therewith two ground electrodes 24 and 26. Supports 28 comprising an insulating material provide support for said ground electrodes and for the formed plastic composition as said composition passes through the apparatus.

There follow a number of illustrative non-limiting examples:

Example 1

There is provided about 4 ft. downstream from the die orifice of a ¾ inch pipe extruder, a high frequency heating apparatus comprising a conventional high potential ring electrode and two ground ring electrodes each ground electrode positioned in coaxial relationship and about four inches on each side of said high potential electrode. Said heating apparatus is operationally connected to a high frequency alternating current power source. Next, a heat curable plastic composition comprising by weight for each 100 parts of high density polyethylene, about 120 parts carbon black and about 2.5 parts 2,5 dimethyl di(t-butylperoxy) hexyne-3 is extruded at a stock temperature of about 290–300° F. The formed pipe issuing from the die is led through said heating apparatus and thence into the associated downstream extruder line apparatus such as quench tanks, haul-off means, etc. Next, the high frequency power source is activated at an output voltage of about 5000 volts and a frequency of about 27 megacycles. A grid dip meter is provided at a point two feet from the heating apparatus and a glass plate is positioned directly above said apparatus.

An infra-red temperature indicator indicates that the formed plastic composition is heated to a temperature of about 415° F. The grid dip meter indicates reception of a frequency of about 27 megacycles at a flux density equivalent to a relatively high (0.8) reading. After about 6 hours of operation the extruder line and the high frequency power source are shut down. The glass plate is removed from above the heating apparatus and it is found that substantial amounts of volatile substances have condensed upon the bottom surface thereof.

Example 2

This example is essentially a duplicate of Example 1 with the exception that the electrodes of Example 1 are replaced with a heating unit of the type illustrated in FIGURES 2 and 3 wherein enclosure 22 and ground electrodes 24 and 26 are constructed of aluminum, supports 28 of tetrafluoroethylene polymer, and electrode 20 of copper. Aperture 19 is connected by conduit to an ice cooled condenser/trap and thence to a vacuum pump. After startup of forming and curing operations, the pump is activated and the flux density 2 feet from the heater is measured with a grid-dip meter and is found to be negligible. After about six hours of operation the bottom of the glass plate positioned above the heater is found to be substantially free of condensed substances. The condenser trap however, is found to contain a substantial amount of condensed substances.

Obviously, many changes can be made in the above description and drawing without departing from the scope of the present invention.

For instance, although the heating apparatus utilized in Example 2 above comprises a single high potential electrode 20 positioned within enclosure means 22 having two ground electrodes 24 and 26, obviously a plurality of high potential electrodes and a plurality of said ground electrodes can be disposed within a single enclosure means 22. Moreover, although the high potential electrode shown in FIGURES 2 and 3 is ring shaped, other shapes can obviously also be utilized.

It should be noted that it is only for the purposes of clarity and simplicity that single apertures 9 and 19 are shown in enclosure means 3 and 22 in each of the figures. While a single aperture through which the atmosphere within the enclosure means can be withdrawn is generally entirely satisfactory, obviously a series of apertures can be utilized. Said apertures can be disposed about the circumference of the enclosure means, along the length thereof, or in any combination desired.

Moreover, although only evacuation of the atmosphere from within enclosure means 22 has been mentioned heretofore, it is obvious that various substances can be added to said atmosphere or that said atmosphere can be replaced or modified for example by introducing substances through aperture 19 under positive pressure. For instance, curing of the plastic composition under a substantially inert atmosphere can be accomplished by charging an inert gas, such as nitrogen, through aperture 19.

It also should be noted that many advantages are realized when wall 23 is constructed of a non-conductive material such as vitreous china provided of course, that ground electrodes 24 and 26 are suitably grounded. However, it is much preferred that said wall consist of a conductive material since there is thus provided a continuous ground surrounding the high potential electrode which provides maximum freedom from spurious radiation and shock hazard.

Accordingly, it is intended and therefore it should be understood that the foregoing specification and examples and the accompanying drawing are illustrative in nature and do not limit the scope of the present invention in any way.

What I claim is:

1. High frequency heating apparatus for curing continuous formed heat-curable plastic compositions which comprises electrically conductive enclosure means having an inlet and an outlet in axial relationship to one another, said enclosure means defining a substantially obstructionless passage between said inlet and outlet, at least two substantially ring-shaped ground electrodes and at least one substantially ring-shaped high potential electrode positioned within said enclosure means, all of the electrodes having a substantially equal internal diameter, each high potential electrode being positioned in alternate arrangement with said ground electrodes and electrically insulated from said enclosure means and in a substantially coaxial relationship with said ground electrodes and said inlet and outlet, each of said ground electrodes communicating electrically with said enclosure means, and at least one aperture means through the walls of said enclosure means communicating with said passage.

2. The apparatus of claim 1 wherein said enclosure means has a circular cross section.

3. The apparatus of claim 1 in combination with means for continuously withdrawing the atmosphere from within said enclosure means through said aperture means, and means to condense condensibles from said withdrawn atmosphere.

References Cited

UNITED STATES PATENTS

| | | | |
|---|---|---|---|
| 2,442,114 | 5/1948 | Brown | 219—10.81 X |
| 2,483,623 | 10/1949 | Clayton | 219—10.65 |
| 2,492,187 | 12/1949 | Rusca | 219—10.61 |
| 2,508,365 | 5/1950 | Bierwirth | 219—10.65 X |
| 3,184,575 | 5/1965 | Sargent | 219—10.65 |

RICHARD M. WOOD, *Primary Examiner.*

L. H. BENDER, *Assistant Examiner.*